C. S. BROWN.
Apparatus for Testing Milk.
No. 48,256.                                    Patented June 20, 1865.
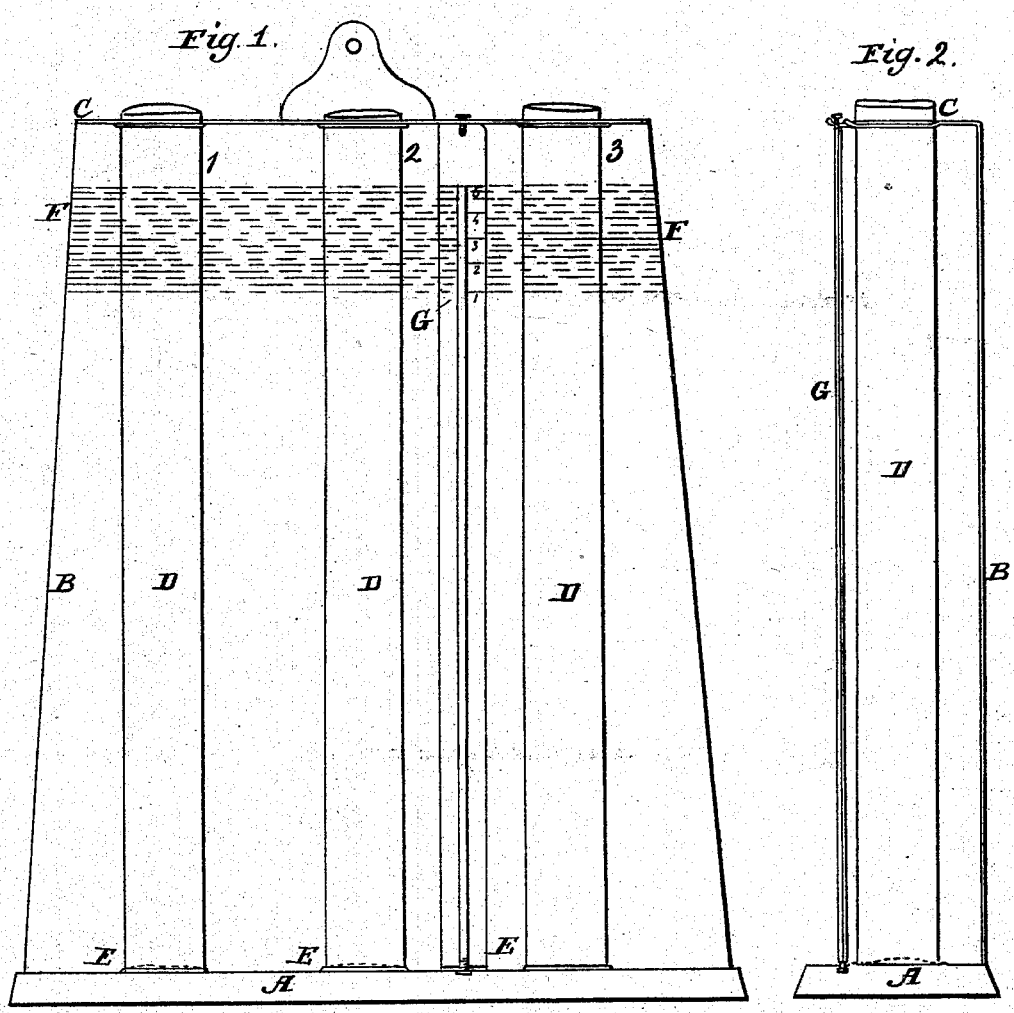

UNITED STATES PATENT OFFICE.

CHAS. S. BROWN, OF NEW YORK, N. Y.

IMPROVED APPARATUS FOR TESTING MILK.

Specification forming part of Letters Patent No. 48,256, dated June 20, 1865.

*To all whom it may concern:*

Be it known that I, CHARLES S. BROWN, of the city, county, and State of New York, have invented certain new and useful Improvements in Apparatus for Testing Milk and other Liquids; and I do hereby declare that the following description and accompanying drawings are sufficient to enable any person skilled in the art or science to which it most nearly appertains to make and use my said improvements without further invention or experiment.

The nature of my invention and improvements in apparatus for testing milk and other liquids is combining with the test-tubes a permanent or movable scale to measure and compare the depth of cream or other matter in each tube with that in the other tubes to ascertain which contains the richest milk.

Figure 1 is a front elevation of an apparatus with my improvements. Fig. 2 is a side elevation.

In these drawings, A is the base, B the standard, and C the top, which constitute the stand or frame to hold the test-tubes D D, which are made of glass, of a convenient length and size for the purpose intended. The top C is perforated, so that the tubes D can be put down through the perforations into the basins E E on the base A, which basins E hold the lower ends of the tubes in their proper places.

F F is a permanent scale of equal parts on the upper part of the standard B, behind the tubes, to enable the user to see the depth of cream or other matter in each tube and compare the quantity one with another.

The numbers 1, 2, and 3 to the left of the tubes are to enable the user to record the numbers or names of the cows from which the milk in the respective tubes was drawn.

G is a traversing-scale, graduated with the sixteenths of an inch, and provided with a pivot at each end, arranged to traverse in slots in the top and base, so that it may be moved from one tube to the others and measure the amount of cream or other matter very accurately. The scale G is provided with screw-nuts at each end to hold the pivots in the slots of the top and base.

Instead of the permanent scale shown in the drawings the standard or frame may be made open, and wire or thread drawn across to form a permanent scale, open behind the tubes.

To use this apparatus the tubes should all be filled as near as may be to the height of the upper mark on the permanent scale F, with the milk of the cows or dairies to be compared. After the milk has stood long enough for the cream to rise, the depth of cream in each tube can be readily measured.

What I claim as my invention and improvements in apparatus for testing milk and other liquids is—

In combination with the test-tubes, a permanent or movable scale to measure and compare the depth of cream or other matter in each tube with that in the other tubes, substantially as described.

CHAS. S. BROWN.

Witnesses:
G. W. STEINBRENNER,
E. R. BROWN.